US009866724B2

(12) United States Patent
Kurkure et al.

(10) Patent No.: US 9,866,724 B2
(45) Date of Patent: Jan. 9, 2018

(54) PIXEL PERTURBATION FOR TRANSMISSION OF META-INFORMATION

(71) Applicant: VMware, Inc., Palo Alto, CA (US)

(72) Inventors: Uday Kurkure, Los Altos Hills, CA (US); Hari Sivaraman, Livermore, CA (US); Peter Farkas, Santa Cruz, CA (US); Xingze He, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 60 days.

(21) Appl. No.: 14/743,580

(22) Filed: Jun. 18, 2015

(65) Prior Publication Data

US 2016/0373609 A1 Dec. 22, 2016

(51) Int. Cl.
*G06K 9/00* (2006.01)
*H04N 1/32* (2006.01)
*G06T 1/00* (2006.01)
*G06T 7/00* (2017.01)

(52) U.S. Cl.
CPC ....... *H04N 1/32219* (2013.01); *G06T 1/0028* (2013.01); *G06T 7/0002* (2013.01); *H04N 1/32277* (2013.01); *H04N 1/32309* (2013.01); *G06T 2201/0051* (2013.01); *G06T 2201/0081* (2013.01); *G06T 2201/0202* (2013.01); *G06T 2207/10024* (2013.01); *G06T 2207/30168* (2013.01)

(58) Field of Classification Search
None
See application file for complete search history.

(56) References Cited

U.S. PATENT DOCUMENTS

| 7,502,488 | B2 | 3/2009 | Abe et al. |
| 7,581,104 | B2 | 8/2009 | Moon |
| 7,606,426 | B1 | 10/2009 | Iwamura |
| 7,831,661 | B2 | 11/2010 | Makhija et al. |
| 7,840,005 | B2 | 11/2010 | Delp et al. |
| 8,166,107 | B2 | 4/2012 | Makhija et al. |
| 8,228,993 | B2 | 7/2012 | Priti et al. |
| 8,347,344 | B2 | 1/2013 | Makhija et al. |

(Continued)

OTHER PUBLICATIONS

Office Action dated May 5, 2016 from U.S. Appl. No. 14/624,599, 8 pages.

(Continued)

*Primary Examiner* — Sean Conner
(74) *Attorney, Agent, or Firm* — Patterson & Sheridan LLP (57) ABSTRACT

Techniques disclosed herein provide an approach using pixel perturbation to transmit information. In one embodiment, a pixel perturbation engine perturbs pixels of an image to encode meta-information therein. In particular, the perturbation engine may perform controlled perturbation of pixel bits which are unlikely to affect visual quality are perturbed, such as perturbing the least significant bits in one or more channels of a RGB or YUV image. Higher order bits may also be perturbed in color channels such as the blue or UV channels that the human eye is less sensitive to. To mitigate loss of information, the information may be encoded using error correcting codes. After the image having meta-information encoded therein is transmitted to a client device, the meta-information may be recovered and used to determine performance of the virtual desktop infrastructures (VDI) system.

18 Claims, 7 Drawing Sheets

(56) References Cited

U.S. PATENT DOCUMENTS

| | | |
|---|---|---|
| 8,910,228 B2 | 12/2014 | Agrawal et al. |
| 9,218,638 B2 | 12/2015 | Mehta et al. |
| 9,330,428 B2 | 5/2016 | Diggins |
| 9,336,117 B2 | 5/2016 | Agrawal et al. |
| 9,392,020 B2 | 7/2016 | Twitchell, Jr. et al. |
| 9,424,478 B2 | 8/2016 | Gn et al. |
| 2003/0058257 A1 | 3/2003 | Yin |
| 2004/0131224 A1* | 7/2004 | Tanaka ................ G06T 1/0028 382/100 |
| 2006/0120558 A1 | 6/2006 | Shi et al. |
| 2006/0156016 A1 | 7/2006 | Tanaka |
| 2009/0129625 A1* | 5/2009 | Zandifar ............. G06T 1/0028 382/100 |
| 2009/0282345 A1 | 11/2009 | Smith et al. |
| 2010/0162338 A1* | 6/2010 | Makhija ............ H04N 21/2402 725/114 |
| 2015/0084979 A1 | 3/2015 | Bidarkar et al. |
| 2016/0269589 A1 | 9/2016 | Sargent |
| 2016/0286075 A1* | 9/2016 | Beck ................ H04N 1/32277 |
| 2016/0373609 A1 | 12/2016 | Kurkure et al. |

OTHER PUBLICATIONS

Non-Final Office Action dated Feb. 16, 2017 in related U.S. Appl. 14/743,633.

* cited by examiner

U: User Image
H: Hidden Image
C: Composite Image
MeasureUserExperience ( U, H )
{
   perturb_bit_position = 0; # LSB
   perturb_op = replacement; # operations may include replace and xor
   C=Perturb(U, H, perturb_bit_position, perturb_op)
   TransmitImage( C );
   Quality = prev_quality = 0;
   loop {
      C=Perturb(U, H, perturb_bit_position, perturb_op)
      TransmitImage( C );
      RecoveredHiddenImage = RecoveredHiddenImage(C, perturbation_bit_position);
      quality = MeasureImageQuality(recoveredHiddenImage)
      if ( quality < Threshold ) {
         perturb_bit_position = perturb_bit_position == 7? 0: perturb_bit_position++;
      } elseif ( quality > previous_quality ) {
         perturb_bit_position = perturb_bit_position == 7? 0: perturb_bit_position--; #perturb_bit_position does
         not change the quality
      C=Perturb(U, H, perturb_bit_position, perturb_op) #perturb_bit_position is indicative of quality
   }
}

PIXEL PERTURBATION FOR TRANSMISSION OF META-INFORMATION

CROSS-REFERENCE TO RELATED APPLICATION(S)

The present application is related to the patent application entitled "Pixel Perturbation for Image Quality Measurement" Ser. No. 14/743,633, which is assigned to the same assignee as the present application and has been filed on the same day as this application.

BACKGROUND

In virtual desktop infrastructures (VDIs), desktop operating systems, hosted on virtual machines (VMs) running on centralized servers, are delivered as a managed service to end users via a network. Such centralized and automated management of the virtualized operating system, applications, and user data provides increased control and cost savings.

In order to ensure proper quality of the virtual desktop delivered through VDI, techniques have been developed to automatically monitor video quality, audio quality, and synchronization of audio and video, among other things. One approach for monitoring quality uses watermarking to measure various performance metrics. For example, two different watermarks may be sent to denote the beginning and end of an operation. The watermarks are detected by the VDI client, and the time difference between the detected watermarks can be used to determine the latency of the operation as perceived by a user of the client device. However, as contents of the virtual desktop's frame buffer are typically sent to the VDI client using VDI display protocols that employ lossy compression, the watermarks may become corrupted. The watermarks may also be also be covered (e.g., by another application) or dropped during transmission. In addition, the watermarks are typically introduced at a gross level that is visible to the user.

In addition, to measure quality of the VDI display image, traditional approaches run benchmarking workloads to simulate or benchmark user experiences with the desktop delivered through VDI. Such benchmarks are run on the VMs, discussed above, and the VDI client connects to the graphical user interface of the virtual desktop over a network using a VDI display protocol such as PC over IP (PCoIP), RDP, or the like. However, such benchmarking workloads typically force the user to view certain pre-selected images as part of the benchmarking process.

SUMMARY

One embodiment provides a computer-implemented method of encoding information in an image transmitted from a first computing device to a second computing device. The method generally includes receiving an image and selecting a plurality of pixels of the image in which information is to be encoded. The method further includes perturbing at least one bit in each of the selected pixels to encode information therein, and subsequent to the perturbing, transmitting the image having the information encoded therein to the second computing device.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques that use pixel perturbation to transmit information. In one embodiment, a pixel perturbation engine, which has access to the graphics pipeline on a server hosting virtual desktops, perturbs pixels of an image to encode meta-information in the image. The encoded meta-information may include information indicating the start or end of an operation, frame numbers, coordinates of an inner frame, watermarks, page numbers, among other things. To encode such meta-information, the perturbation engine performs controlled perturbation in which image pixel bits that are unlikely to affect visual quality are perturbed. For example, perturbations that are essentially imperceptible may be made by controlled perturbation of the least significant bits in one or more color channels of the image, or perturbations of higher order bits in channels (e.g., the blue channel) that human eyes are less sensitive to. To mitigate the loss of meta-information, e.g., as a result of lossy compression, the perturbation engine may further encode the meta-information using error correcting codes or repeatedly encode the meta-information for redundancy purposes, among other things. After the image having meta-information encoded therein is transmitted to a client device, the meta-information is recovered and used to determine performance of the virtual desktop infrastructures (VDI) system.

In another embodiment, the pixel perturbation engine perturbs pixels in an image containing a reference image that is used to measure quality of the image as received at a VDI client. By using the least significant bits in such perturbations, the perturbation engine may generate a composite image in which the reference image is hidden in the original image. After the composite image is transmitted to a client device, the perturbations from the composite image is then recovered and used to determine image quality based on preservation of the perturbations. In particular, the hidden image represented by the perturbations may be compared with a locally stored copy of the reference image, with the correlation between these images indicating quality of the transmitted image. In one embodiment, display image(s) perturbed with reference images at increasingly higher bit positions are transmitted, and the image quality determined, until the determined quality exceeds a predefined threshold. The perturbed bit position at which the determined quality exceeds the predefined threshold would then be indicative of the transmitted image's quality Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
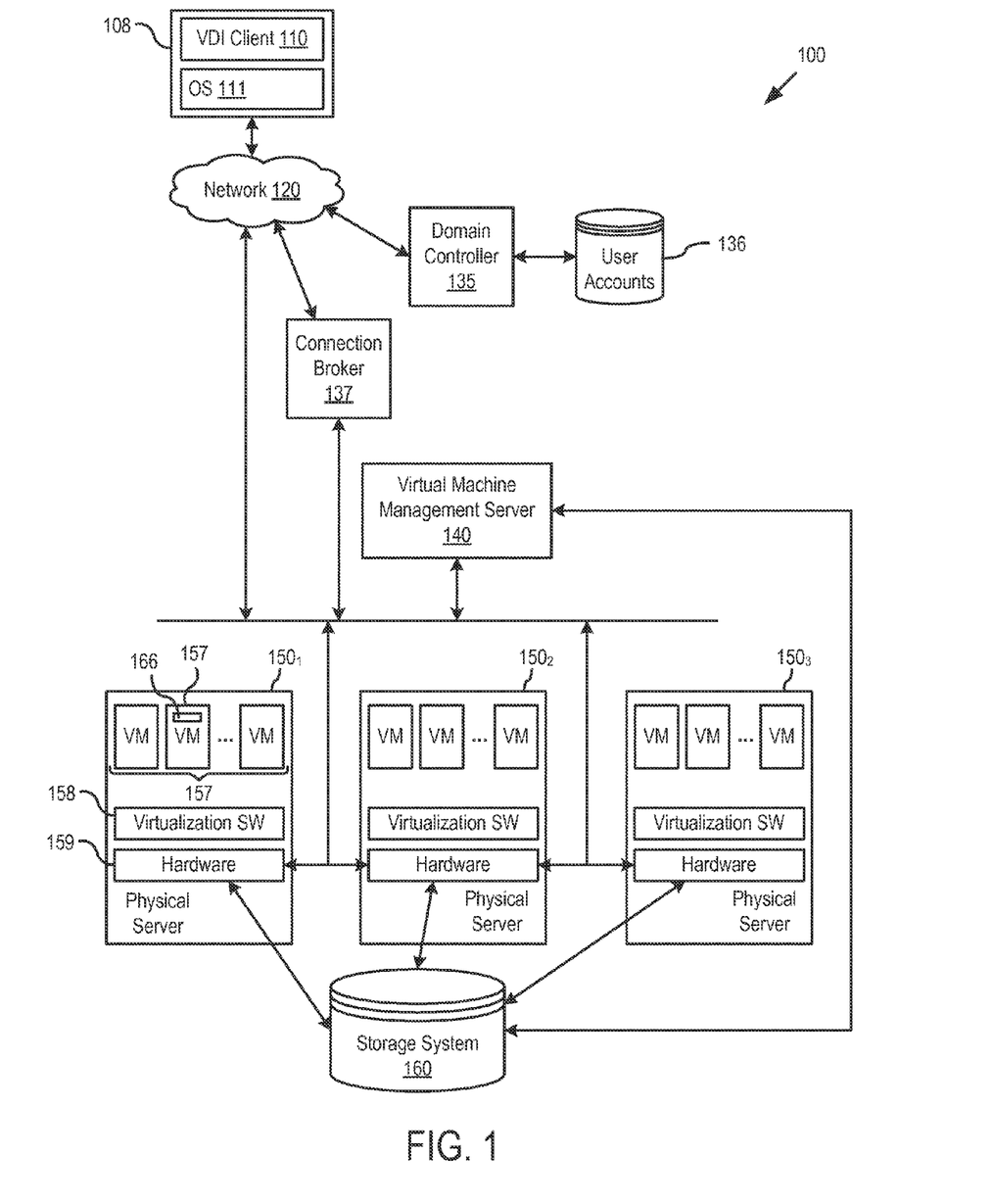
FIG. 1 illustrates components of a virtualized desktop infrastructure system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 108, run on operating systems of local computing devices, e.g., client machine 108 on top of an operating system (OS) 111. VDI clients provides an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 and virtual machines 157 are instantiated on a plurality of physical computers $150_{1-3}$, each of which includes virtualization software 158 and hardware 159, is controlled by a virtual machine management server 140, and is coupled to a shared persistent storage system 160.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

In the embodiments described herein, a pixel perturbation engine (not shown) running in host computer 150, 152, or 154 perturbs pixels of an image to encode meta-information in the image. As discussed in greater detail below, the perturbation engine may have access to a graphics pipeline and be configured to encode meta-information in the least significant bits of the image so that the encoded meta-information is essentially imperceptible. The perturbation engine may further encode the meta-information using error correcting codes, repeatedly encode the meta-information for redundancy purposes, and/or encode the meta-information after lossy compression to mitigate loss of the meta-information through lossy compression, as discussed in greater detail below. The encoded meta-information is then recovered from the image on the client 108 side to measure performance of the virtual desktop infrastructures (VDI) system, as discussed in greater detail below.

In another embodiment, the pixel perturbation engine perturbs pixels in the display image with a reference image to generate a composite image in which the reference image is hidden in the original image. Perturbations in the composite image are then recovered on the client 108 side and used to determine image quality based on preservation of the perturbations, as discussed in greater detail below.

Figure 2:
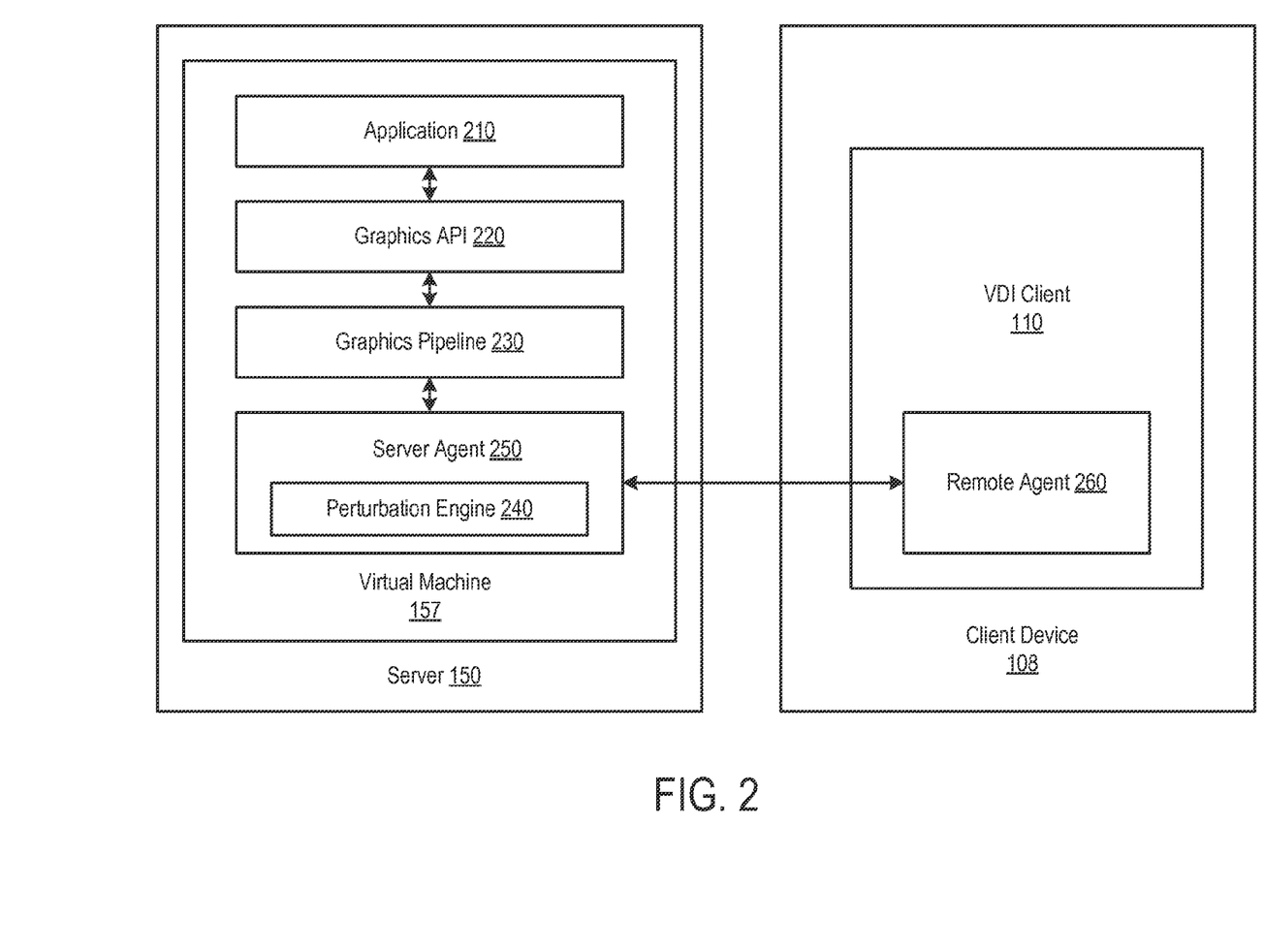
FIG. 2 is a block diagram that illustrates agents implemented in a server and a client to carry out controlled perturbation of an image according to an embodiment.

FIG. 2 is a block diagram illustrating agents implemented in a server and a client to carry out controlled perturbation of an image according to an embodiment. As shown, an application 210 running in host computer 150 invokes a graphics application programming interface (API) 220 to update a displayed image. In turn, a graphics pipeline 230 generates a frame buffer (not shown) which includes updated display image information. It should be understood that graphics pipeline 230 is at the frame buffer level and independent of the underlying graphics pipeline in the computer system for hardware acceleration of rendering operations. Of course, hardware acceleration may be used to manipulate contents of the frame buffer, but hardware acceleration is not required.

The frame buffer generated by graphics pipeline 230 is encoded by server agent 250 using a VDI display protocol such as PC over IP (PCoIP), virtual desktop protocol (RDP), or the like, and server agent 250 then sends the encoded frame buffer to a remote agent 260 in VDI client 110. The received frame buffer data is then used to update a remote display on the client device 108 side.

A perturbation engine 240, which is illustrated as part of server agent 250 but may also be a module that interacts with server agent 250, has access to the graphics pipeline 230 and is configured to perform controlled perturbation of the display image to encode meta-information or a reference image therein, prior to encoding of the display image using a VDI display protocol by server agent 250 and transmission of the same to remote agent 260. The controlled perturbations is introduced in a manner that does not significantly affect the visual quality of the display image, such as by perturbing the least significant bits in one or more channels of the RGB display image, perturbing higher order bits in channels that the human eye is less sensitive to, and the like, as discussed in greater detail below. In an alternative embodiment (not shown), perturbation engine 240 perturbs bits in one or more channels of a YUV image, after the RGB display image is converted to such a YUV image for transmission via the VDI display protocol. A number of VDI display protocols require conversion of the RGB display image to a YUV image. In yet another embodiment, perturbation engine 240 perturbs bits of a JPEG image after the YUV image has been compressed to such a JPEG image according to the JPEG format compression scheme. In such a case, the bits may be perturbed after the discrete cosine transform in the JPEG compression scheme and the perturbations recovered on the client side prior to the reverse transform.

In one embodiment, perturbation engine 240 encodes the meta-information using an error correcting code to be able to recover from quantization errors introduced by compression techniques used by VDI display protocols that affect the least-significant bits of an image. In general, quantization errors tend to be more significant than network losses. In another embodiment, perturbation engine 240 repeatedly encodes the meta-information to provide redundancy, which may also mitigate errors that are introduced. In yet another embodiment, perturbation engine 240 encodes meta-information after the lossy compression to avoid quantization errors.

VDI client 110, running in client device 108, is configured to retrieve the controlled perturbations from the display image data in the frame buffer that is received by remote agent 260, and to measure the display image's quality based on preservation of the perturbations or performance of the VDI infrastructure based on the encoded meta-information. To measure performance of the VDI infrastructure, VDI client 110 may make use of the encoded meta-information in any feasible manner. For example, the meta-information may include frame numbers, and VDI client 110 may determine if any frames were lost based on the frame numbers. As another example, the meta-information may include start and end points of an operation, and VDI client 110 may use the time difference between the start and end points to determine latency of the operation as perceived by a user of client device 108.

To measure image quality, VDI client 110 compares the reference image encoded by the controlled perturbations with a locally stored copy of the reference image. In general, correlation between the encoded reference image and the locally stored reference image is indicative of correlation between the original display image transmitted by server agent 250 and the display image received at remote agent 260, and therefore the quality of the received display image. In one embodiment, quality measurement application employs Structural similarity (SSIM), peak signal-to-noise ratio (PSNR), and/or mean squared error (MSE) to compare the extracted reference image with the locally stored copy of reference image to determine image quality based on the number of flipped bits in the extracted reference image.

Figure 3:
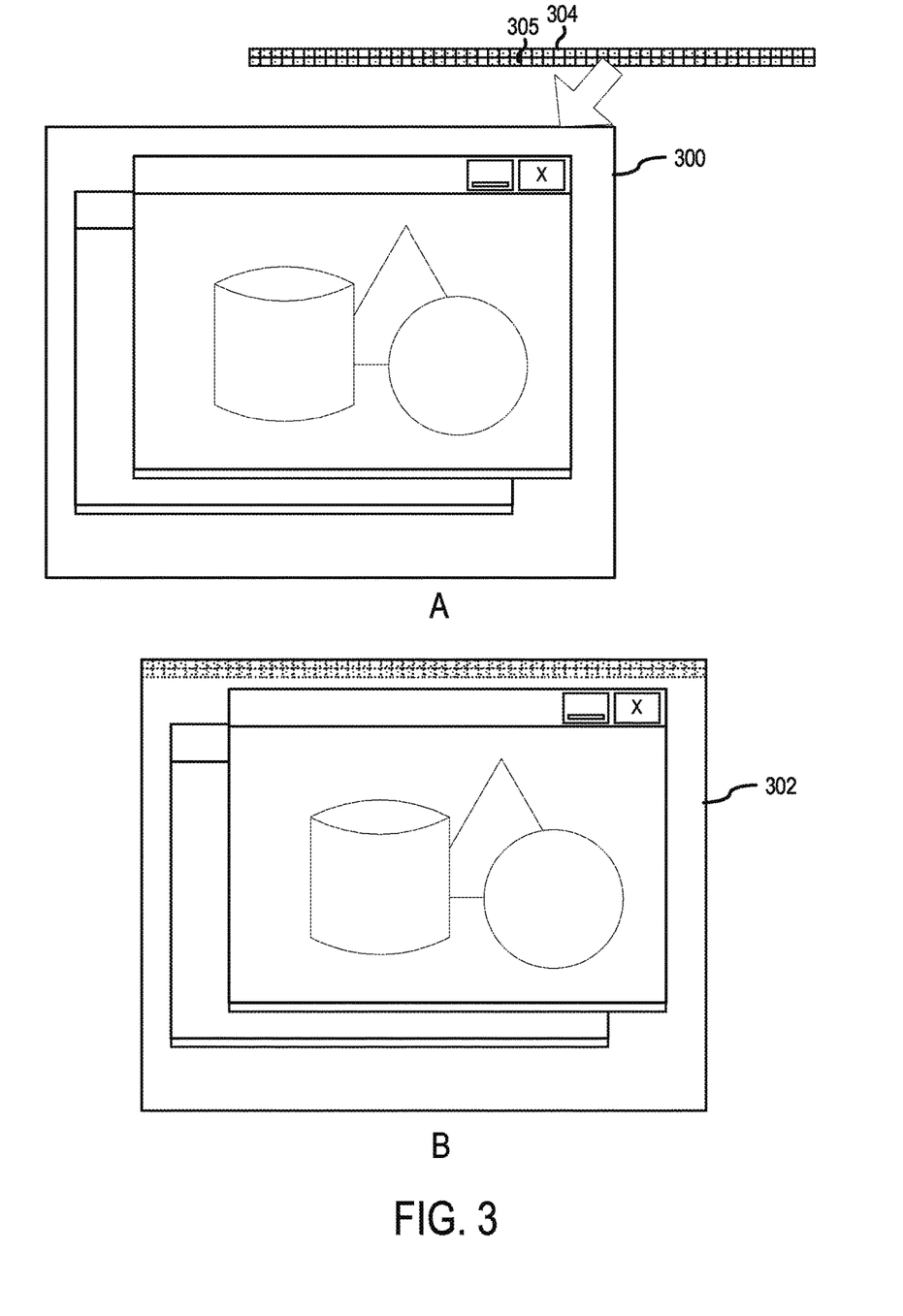
FIG. 3 illustrates an example image that is perturbed to encode meta-information, according to an embodiment.

FIG. 3 illustrates an example image 300 that is perturbed to encode meta-information, according to an embodiment. As shown in panel A, image 300 depicts the user interface of a virtual desktop. Such an image 300 is retrieved from graphics pipeline 230 by perturbation engine 240, which then perturbs pixels of image 300 to encode meta-information therein. Illustratively, the meta-information are encoded in two scan lines 304-305 which are the two top scan lines of image 300, and the resulting image 300 is shown in panel B. It should be understood, however, that any number of pixels in any feasible arrangement may be used to encode meta-information. For example, another embodiment may encode meta-information in black and white tile patterns (e.g., with a tile size 8×8 for each black and white tile) interpreted as a sequence of 0's and 1's, which is one form of a watermark. The tile sizes and the manner in which bits are perturbed may be varied within a single tile to ensure substantial compression and error resilience.

In one embodiment, perturbation engine 240 perturbs the least significant bits in one or more channels of image 300. If image 300 is an RGB image, for example, then each pixel's color may be represented by 8 to 12 bits, depending on whether the display is True-Color (24-bit) or Deep Color (30/36/48 bit). In such a case, perturbation engine 240 perturbs the least significant bits in one or more of the RGB channels. Such perturbation of the least significant bits in one or more RGB channels of two scan lines 304-305 may have little effect on visual quality, in contrast to the traditional watermarks and pixel tiles which were visible to the user.

In another embodiment, perturbation engine 240 also perturbs higher order bits to encode meta-information. Least significant bits are most susceptible to quantization errors in the lossy compression algorithms that are commonly used by VDI display protocols. Such quantization errors arise because compression algorithms typically employ discrete cosine transform (DCT) or wavelet transform to convert the space domain to frequency domain or space-frequency domain (wavelet), with quantization being used to represent the newly obtained values. For lossy compression, fewer quantization levels may be used, and this quantization step may make least significant bits into zeroes. To avoid such quantization errors, perturbation engine 240 may perturb higher order bits to encode meta-information. In particular, perturbation engine 240 may use higher order bits of channels that the human eye is less sensitive to. For example, the human eye is most sensitive to green, then to red, and then to blue. Thus, in one embodiment, perturbation engine 240 perturbs higher order bits in the blue and red channels of an RGB image. For example, perturbation engine 240 may perturb the $0^{th}$ bit from the green channel, the $1^{st}$ bit from the red channel, and the $2^{nd}$ bit from the blue channel. In another embodiment, perturbation engine 240 perturbs higher order bits in only a few scan lines (e.g., scan lines 304-305) or tiles, in which case the degradation in visual quality will be barely perceptible to the user.

In a further embodiment in which RGB channels of the display image have been converted to the YUV color space, such as when the frame buffer is transmitted according to certain VDI display protocols, perturbation engine 240 perturbs the least significant bits from the Y channel and higher order bits from the UV channel to encode meta-information. As the human eye is most sensitive to brightness, perturbing only the higher order bits from the UV channel may have minimal affect on image quality. In an alternative embodiment, rather than perturbing the YUV image itself, perturbation engine 240 instead perturbs least significant bits in certain channels of a JPEG image after the YUV image has been compressed to such a JPEG image according to the JPEG format compression scheme. As discussed, the bits may be perturbed after the discrete cosine transform in the JPEG compression scheme and the perturbations recovered on the client side prior to the reverse transform.

In another embodiment, perturbation engine 240 mitigates loss of meta-information by encoding the meta-information using error correcting codes. In general, the number of check bits required in such an error correcting code is given by the following relationship: number check bits=t*log n, where t is the number of errors to be corrected and n is the message length. Long distance communication or network congestion may cause the remote control protocol to use highly lossy compression. Perturbation engine 240 varies the number of check bits that are used to correct errors depending on network condition. For example, if client device 108 is connecting to a virtual desktop over a wide area network, then perturbation engine 240 may use more check bits to encode the meta-information. In one embodiment, perturbation engine 240 chooses between encoding schemes based on a number of factors, including length of the message to encode and the time it takes to encode and decode the message. For example, if the message length is small, perturbation engine 240 may use a table lookup to encode and decode messages. In another embodiment, perturbation engine 240 may use a lossy compression proof technique for encoding the meta-information. As discussed, the quantization step of lossy compression algorithms can make least significant bits zeroes. However, as no lossy compression related errors are introduced after this quantization step, a lossy compression proof technique may involve using the least significant bits after quantization to encode meta-information. The meta-information is then retrieved on the client device 108 side prior to de-quantization.

In another embodiment, perturbation engine 240 employs redundancy to mitigate loss of meta-information. Error correcting codes may correct up to t bits out of n bits if the number of check bits is t log n. However, the error correcting codes may be able to correct more than t bits of errors. Perturbation engine 240 uses redundancy to overcome this limitation by repeatedly encoding the same messages, and a voting procedure is used to determine the correct meta-information, i.e., the majority wins. The number of repetitions may generally be related to the number of errors as follows: number of repetitions=2e+1, where e is the number of errors.

In yet another embodiment, perturbation engine 240 does not use all available bits and instead only perturb bits that fall within a region of the image with changed pixel values that are transmitted to remote agent 260. That is, perturbation engine 240 may access a region of the frame buffer that has different pixel values as compared to a last image update, and perturb bits inside such a region. This is an improvement over traditional watermarking techniques which alter pixel values overtly in a fixed region of the screen and may thus add to the number of pixels transferred over the network if the watermark does not overlap the region of the screen with changed pixel values. As a result, perturbing bits that fall within a region having changed pixel values the following advantages, among others: the amount of data transferred is a function of the size of the image that is transferred, so it is adaptive to the load; the perturbed bits may be essentially imperceptible and do not obscure the desktop; and no additional data needs to be transferred.

Figure 4:
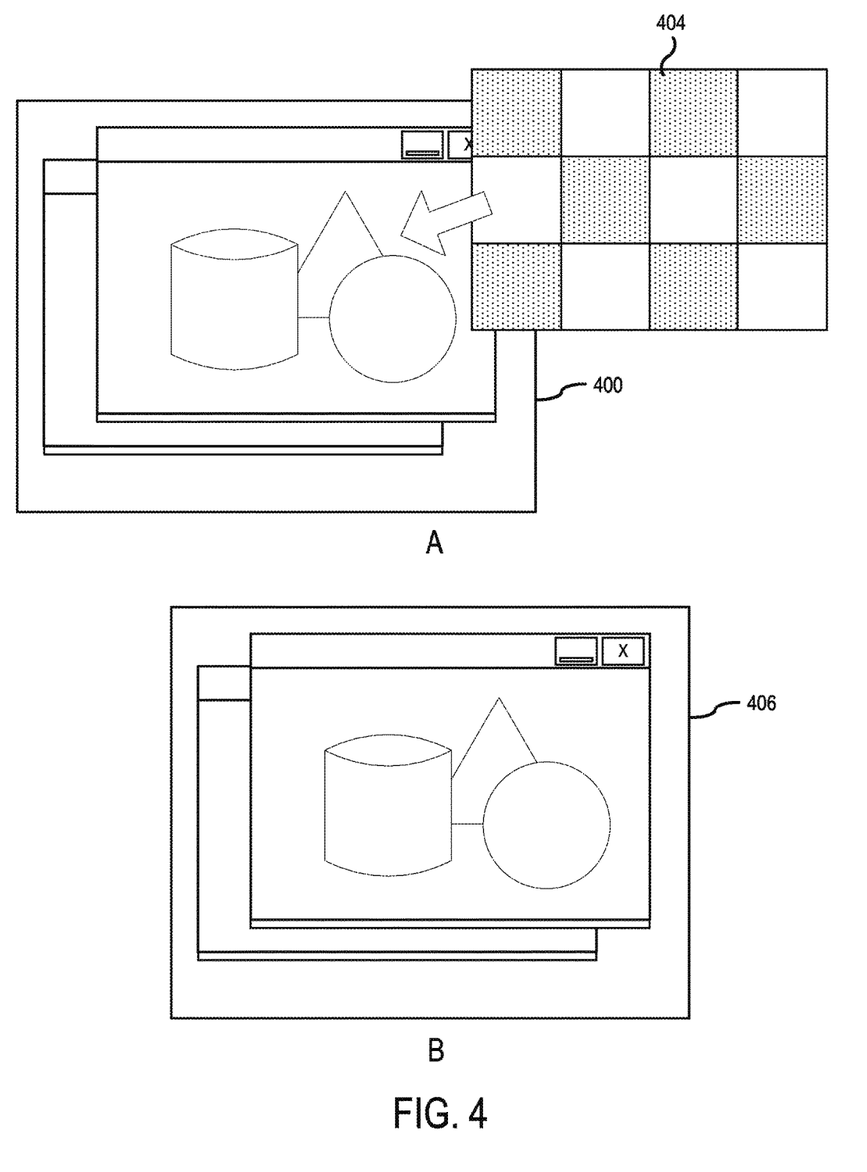
FIG. 4 illustrates an example image that is perturbed with a reference image, according to an embodiment.

FIG. 4 illustrates an example image 400 which depicts the user interface of a virtual desktop and which is perturbed with a reference image 404, according to an embodiment. As shown, the resulting composite image 406 includes both example image 400 and reference image 404, but reference image 404 is essentially imperceptible in composite image 406. Perturbation engine 240 may thus "hide" reference image 404 in example image 400 by perturbing certain bits of pixel values. Illustratively, reference image 404 is a particular black and white pattern. It should be understood, however, that any image, having any type of pattern or no pattern, may be used as reference image 404.

In one embodiment, perturbation engine 240 perturbs a given number (e.g., two) of least significant bits in one or more channels of image 400 with some or all bits of reference image 404. As discussed, the least significant bits are most likely to be affected by compression and decompression in the VDI display protocol. Accordingly, perturbation engine 240 may perturb the least significant bits of image 400 with reference image 404, and VDI client 110 may then compare reference image 404, as extracted from the received composite image 406, with a locally stored copy of reference image 404 to measure quality of the image 400 that is received at the client device 108 side. As discussed, SSIM, PSNR, and MSE may be used to compare the extracted reference image 404 with the locally stored copy of reference image 404 to determine quality of image 400.

If the pixels of reference image 404 only have a few (e.g., two) bits of color information for the RGB channels, the quality of reference image 404 may not be high. In turn, an image quality metric based on such a low quality reference image 404 may be misleading. To avoid such misleading image quality measurements, perturbation engine 240 may perturb a given number (e.g., two) of least significant bits of image 400 using all 8-bits of each of the RGB channels of reference image 404. Assuming two least significant bits are used, reference image 404 may be one quarter the size of image 400 and "hidden" four times in image 400, two bits at a time. In such a case, reference image 404 retrieved on the client device 108 side will have all 8-bits of color information for the RGB channels, and the image quality metric based on the high-quality reference image will be a better indication of quality of the received image 400 without perturbations.

In one or more embodiments, perturbation engine 240 may operate to: perturb the entire virtual desktop display; perturb one or more tiles of size 8×8, 16×16, 32×32, or any other feasible size; perturb one or more color channels; perturb one or more bits, which may include any bits from the least significant to the most significant bits in any or all channels; perturb different bits in different channels; perturb the image with a regular pattern or a reference image, the pattern being a diagonal, alternating pixels, spiral of pixels, spokes of a wheel, alternating columns and rows, a zigzag line through a tile; and black and white patterns such as reference image 404.

Figure 5:
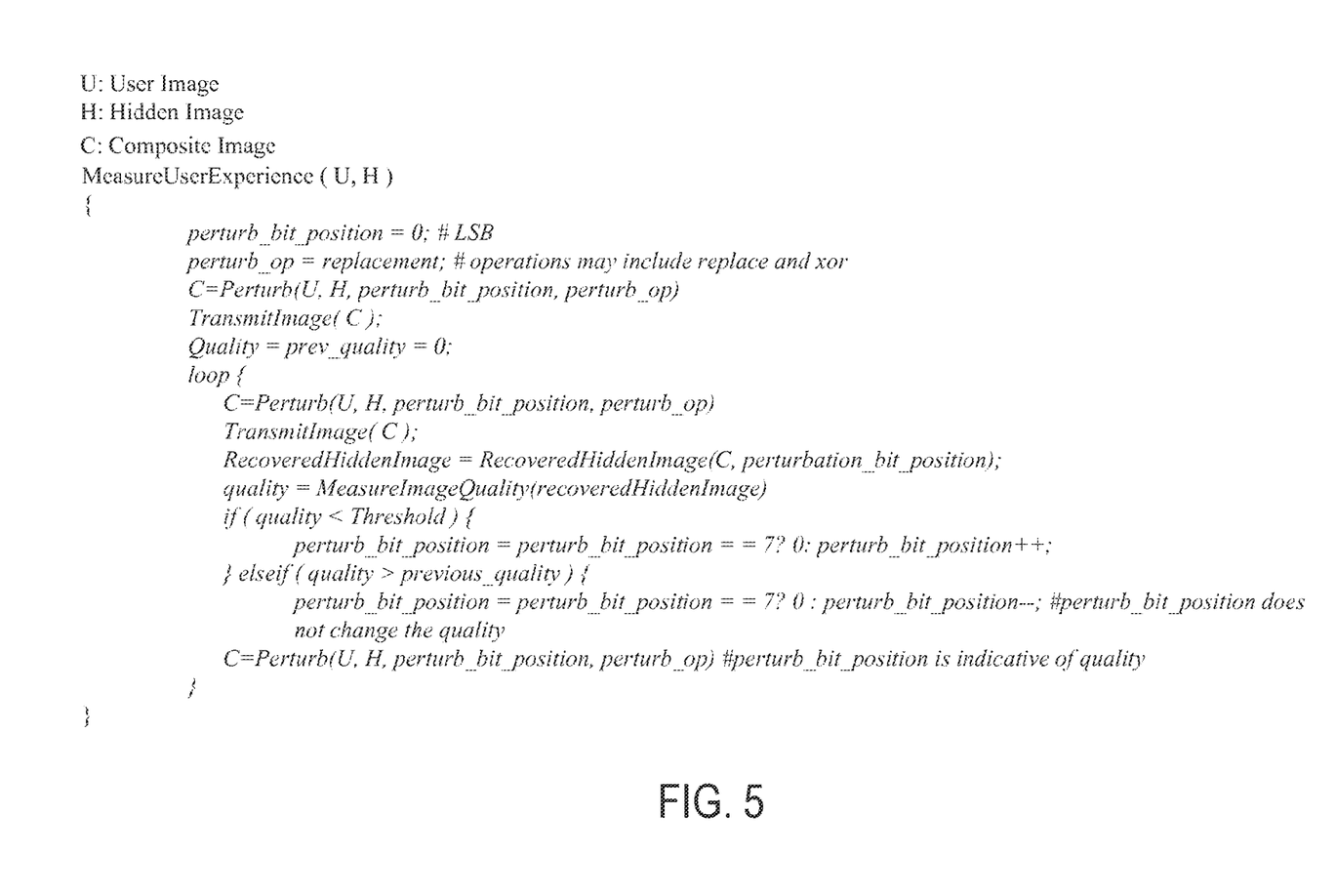
FIG. 5 illustrates example pseudo-code for measuring image quality, according to an embodiment.

In one embodiment, display image(s) may be repeatedly perturbed using higher order bits, and the resulting image quality measured on the client device 108 side, until an image quality threshold is met. The lowest perturbed bit position is indicative of the transmitted image's quality, with the image quality being higher for lower perturbed bit positions that meet the image quality threshold, and vice versa. An example pseudo-code of such repeated perturbations to measure image quality is shown in FIG. 5, the steps of which are discussed in greater detail below. In FIG. 5, it should be understood that the original image U that is to be displayed to the user may be restored using the XOR property U=(U xor H). In an alternative embodiment, perturbation engine 240 may embed multiple (e.g., 8) reference images at the same time using a different position for the perturbation bit for each reference image, rather than repeatedly increasing the perturbed bit position.

Similar to the discussion above, in one embodiment, perturbation engine 240 may not use all available bits and instead only perturb bits that fall within a region of the image with changed pixel values that are transmitted to remote agent 260. That is, perturbation engine 240 may access a region of the frame buffer that has different pixel values as compared to a last image update, and perturb bits inside such a region with bits from a region of reference image 404.

Perturbing image 400 with reference image 404 allows real-time measurement of and feedback on quality of the display image presented to the user. In one embodiment, VDI client 110 may collect the quality metrics derived from the comparing the extracted reference images with the locally stored copy of those reference images and compute statistical measures such as mean, standard deviation, sum, minimum, maximum, and the like. VDI client 110 may then present such statistical data to the user, either in real-time or not in real-time.

Figure 6:
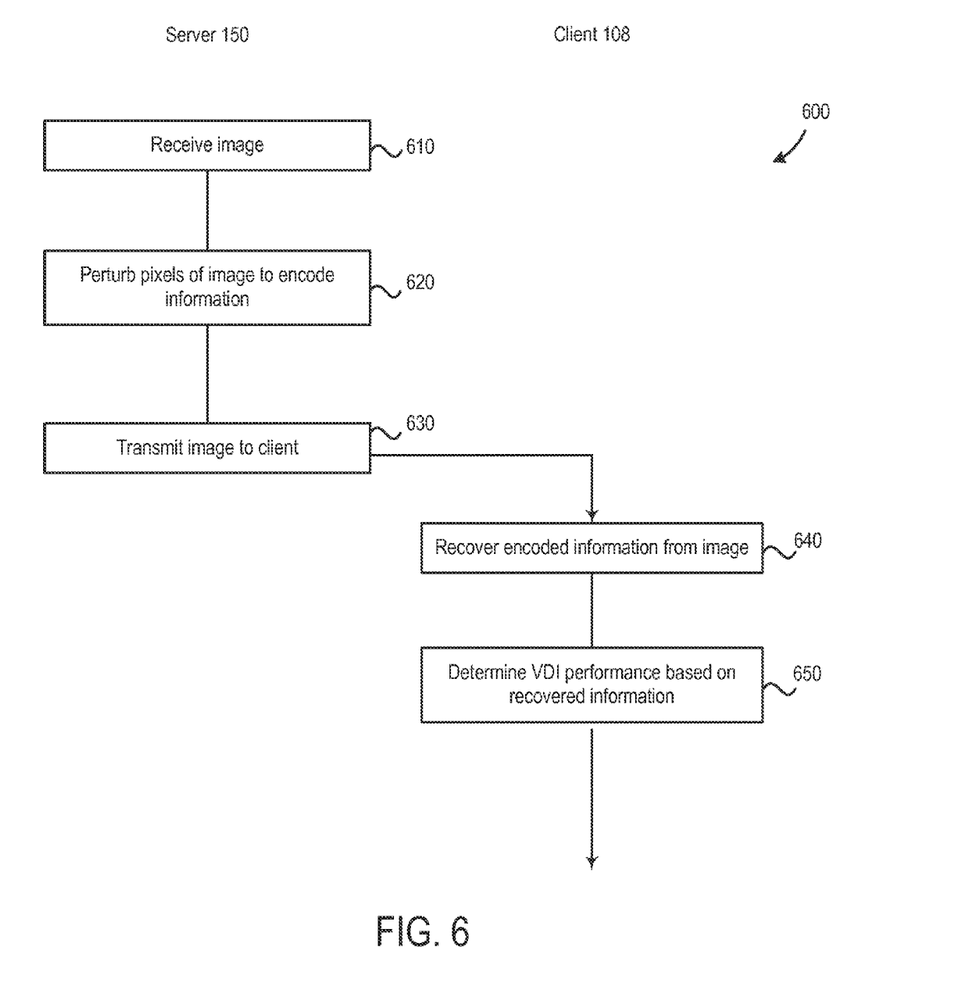
FIG. 6 illustrates a method of information transmission, according to an embodiment.

FIG. 6 illustrates a method 600 of information transmission, according to an embodiment. As shown, method 600 begins at step 610, where perturbation engine 240 receives an image. As discussed, perturbation engine 240 may have access to a graphics pipeline which generates virtual desktop images in one embodiment. Perturbation engine 240 may retrieve RGB images of the virtual desktop from the graphics pipeline or, alternatively, retrieve YUV images or JPEG images resulting from the compression of such YUV images, after VDI display protocol conversion of the RGB images (and subsequent compression, if appropriate).

At step 620, perturbation engine 240 perturbs pixels of the received image to encode information. The encoded information may include any meta-information useful for measuring VDI performance or otherwise, such as a watermark, frame number information, page number information, document identification information, information indicating the start and endpoints of an operation, information indicating coordinates of an inner frame (e.g., a window) or the intended movement of a window, which application(s) are running, whether a particular window is showing, and the like. It should be understood that the type of information used will generally depend on the application or applications being monitored. For example, performance of a video stream provided by a video player application may be measured using frame numbers to detect if any frames are lost. In such a case, perturbation engine 240 may perturb pixels of the received image to encode the frame numbers.

As discussed, perturbation engine 240 perturbs the least significant bits in one or more channels of the image in one embodiment so that the perturbations are essentially imperceptible. In another embodiment, perturbation engine 240 perturbs one or more higher order bits, and in particular higher order bits in the blue channel (for RGB images) or UV channel (for YUV images) which human eyes are least sensitive to, to mitigate the susceptibility of least significant bits to quantization errors in the lossy compression. In other embodiments, perturbation engine may employ error correcting codes and/or redundancy to mitigate loss of meta-information At step 630, server agent 250 transmits the image having perturbed pixels to remote agent 260. Then, at step 640, VDI client 110 recovers the encoded information from the transmitted image, by extracting the perturbed pixels. Finally, at step 650, VDI client 110 determines VDI performance based on the recovered information. As discussed, the particular information that is encoded may depend on the application or applications being monitored. Similarly, any feasible performance metric may be constructed to analyze the encoded information that is recovered on the client device 108 side. For example, the performance metric may measure how many frames or pages are lost. As another example, the performance metric may measure the latency of an operation as perceived by the user of client device 108 based on start and end point information. VDI client 110 may also collect the performance measurements and compute statistical measures such as mean, standard deviation, sum, minimum, maximum, and the like. VDI client 110 may then present such statistical data to the user, either in real-time or not in real-time.

Figure 7:
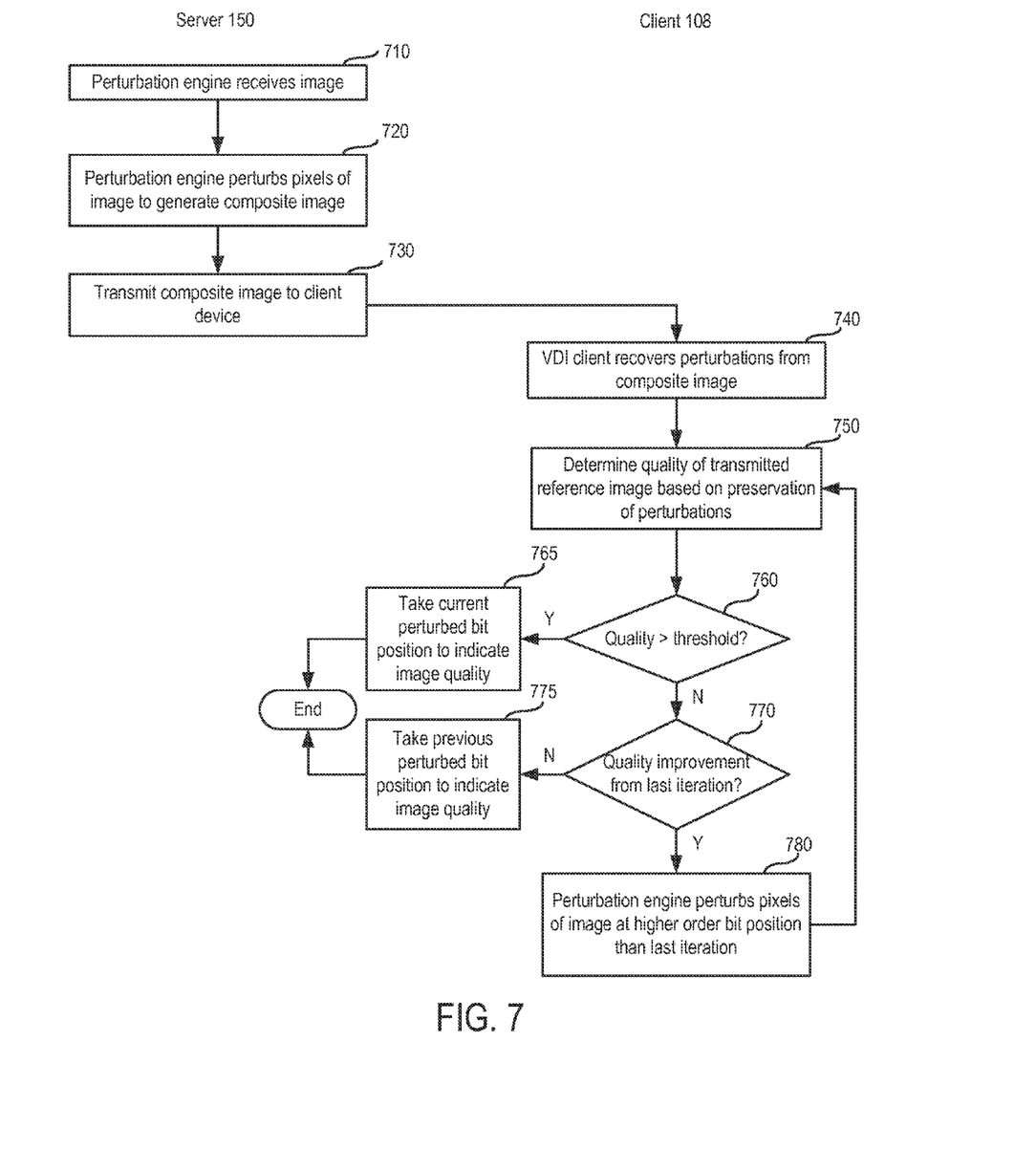
FIG. 7 illustrates a method of image quality measurement, according to an embodiment.

FIG. 7 illustrates a method 700 of image quality measurement, according to an embodiment. As shown, method 700 begins at step 710, where perturbation engine 240 receives an image. Similar to the discussion above with respect to step 510, perturbation engine 240 may have access to a graphics pipeline and retrieve RGB images of the virtual desktop from the graphics pipeline or, alternatively, retrieve YUV images or JPEG images resulting from the compression of such YUV images after VDI display protocol conversion of the RGB images (and compression, if appropriate).

At step 720, perturbation engine 240 perturbs pixels in an image with a reference image, thereby generating a composite image in which the reference image is "hidden" in the original image. As discussed, perturbation engine 240 may perturb a given number of least significant bits in one or more channels in one embodiment. It is assumed for illustrative purposes that perturbation engine 240 initially perturbs bit position 0 at step 720, and then perturbs higher order bits if necessary, as discussed in greater detail below.

In one embodiment, perturbation engine 240 may perturb the least significant bits of the image using all 8-bits of each of the RGB channels of a higher quality reference image. As discussed, perturbation engine 240 may generally perturb the entire virtual desktop display; perturb one or more tiles of size 8×8, 16×16, 32×32, or any other feasible size; perturb one or more color channels; perturb one or more bits, which may include any bits from the least significant to the most significant bits in any or all channels; perturb different bits in different channels; or perturb the image with a regular pattern or a reference image, the pattern being a diagonal, alternating pixels, spiral of pixels, spokes of a wheel, alternating columns and rows, a zigzag line through a tile, or other black and white patterns, among other things.

At step 730, server agent 250 transmits the image having perturbed pixels to remote agent 260. Then at step 740, VDI client 110 recovers the perturbations from the composite image. At step 750, VDI client 110 determines quality of the transmitted reference image based on preservation of the perturbations. SSIM, PSNR, and/or MSE are among the techniques that may be used to compare the recovered perturbations with a locally stored copy of the reference image to determine quality of reference image. As discussed, it may be assumed that correlation between the recovered reference image from the perturbations and the locally stored copy of the reference image is reflective of correlation between the original image prior to and after transmission, i.e., the quality of the transmitted image.

At step 760, VDI client 110 determines if the quality of the transmitted reference image meets a predefined threshold. If the image quality meets the predefined threshold, then at step 765, the current perturbed bit position is taken to indicate image quality. As discussed, the lowest perturbed bit position that meets the image quality threshold is an indicator of the transmitted image quality, with lower perturbed bit positions indicating higher image quality, and vice versa. If, however, the quality does not meet the predefined threshold, VDI client 110 determines if the quality has improved since a last perturbed bit position. If the quality has improved, then perturbation engine 240 may be notified that the predefined threshold has not been met and perturb pixels of an image again, but using a higher bit position at step 780. This process may occur repeatedly until either the threshold is met or the image quality does not improve, as determined at step 770, which is a termination condition upon which the previous perturbed bit position may simply be taken to indicate the image quality at step 775.

In another embodiment, perturbation engine 240 may embed multiple (e.g., 8) reference images at the same time using a different position for the perturbation bit for each reference image. Such a parallel implementation may be employed in lieu of repeatedly increasing the perturbed bit position, discussed above.

Advantageously, techniques disclosed herein permit information to be encoded in images through pixel perturbation. The encoded information may be used in various ways, including for benchmarking or capacity planning for a virtual desktop infrastructure (VDI) service. By perturbing certain bits, such as the least significant bits of a few scan lines or tiles, the information may be encoded in a manner that is essentially imperceptible to the user. This is in contrast to traditional watermarking techniques which relied on watermarks that were visible to the user and could not store less information than scan lines. Further, some embodiments disclosed herein employ error correcting codes or redundancy to more reliably transmit meta-information over noisy channel and mitigate vulnerability of the least significant bits to quantization errors introduced during lossy compression. In addition, techniques disclosed herein perturb a display image with a reference image for image quality measurement. Such controlled perturbations may also use, e.g., least significant bits to minimize the perceptibility of the perturbations. As a result, visual quality of the image the user sees can be measure in real time without running a benchmarking workload that displays pre-specified images to the user.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of encoding information in an image transmitted from a first computing device to a second computing device, comprising:
   receiving an image;
   perturbing at least one bit in each pixel of a plurality of pixels selected from the received image to encode information therein, wherein at least one other bit in each of the plurality of selected pixels is not perturbed, and wherein bits in one or more bit positions that are higher than one or more least significant bit positions are perturbed in a blue but not a green channel where the received image is a RGB image or a UV but not a Y channel where the received image is a YUV image; and
   subsequent to the perturbing, transmitting the image having the information encoded therein to the second computing device.

2. The method of claim 1, wherein the perturbing includes perturbing one or more least significant bits in one or more channels of the selected pixels of the received image.

3. The method of claim 2, wherein the bits are perturbed after a quantization step performed during lossy compression of the received image.

4. The method of claim 1, wherein the perturbed pixels are pixels in one or more scan lines or pixel tiles.

5. The method of claim 1, wherein the received image is a displayed image of a virtual desktop.

6. The method of claim 5, wherein the information includes meta-information for benchmarking or capacity planning of a virtual desktop infrastructure (VDI) service providing the virtual desktop.

7. The method of claim 6, wherein the meta-information includes at least one of information indicating the start or end of an operation, information indicating the intended movement of a window, information indicating which applications are running, information indicating whether a particular window is showing, a frame number, a page number, coordinates of an inner frame, a watermark, and a document identifier.

8. The method of claim 1, wherein the information is encoded using an error correcting code.

9. The method of claim 1, wherein the information is repeatedly encoded for redundancy.

10. A non-transitory computer-readable storage medium containing a program which, when executed by one or more processors, performs operations for encoding information in an image transmitted from a first computing device to a second computing device, the operations comprising:
    receiving an image;
    perturbing at least one bit in each pixel of a plurality of the selected pixels selected from the received image to encode information therein, wherein at least one other bit in each of the plurality of selected pixels is not perturbed, and wherein bits in one or more bit positions that are higher than one or more least significant bit positions are perturbed in a blue but not a green channel where the received image is a RGB image or a UV but not a Y channel where the received image is a YUV image; and
    subsequent to the perturbing, transmitting the image having the information encoded therein to the second computing device.

11. The computer-readable storage medium of claim 10, wherein the perturbing includes perturbing one or more least significant bits in one or more color channels of the selected pixels of the received image.

12. The computer-readable storage medium of claim 11, wherein the bits are perturbed after a quantization step performed during lossy compression of the received image.

13. The computer-readable storage medium of claim 10, wherein the perturbed pixels are pixels in one or more scan lines or pixel tiles.

14. The computer-readable storage medium of claim 10, wherein the information includes meta-information for benchmarking or capacity planning of a virtual desktop infrastructure (VDI) service providing a virtual desktop.

15. The computer-readable storage medium of claim 14, wherein the meta-information includes at least one of information indicating the start or end of an operation, information indicating the intended movement of a window, information indicating which applications are running, information indicating whether a particular window is showing, a frame number, a page number, coordinates of an inner frame, a watermark, and a document identifier.

16. The computer-readable storage medium of claim 10, wherein the information is encoded using an error correcting code.

17. The computer-readable storage medium of claim 10, wherein the information is repeatedly encoded for redundancy.

18. A system, comprising:
    a processor; and
    a memory, wherein the memory includes a program executable in the processor to perform operations for encoding information in an image transmitted from the system to another computing device, the operations comprising:
    receiving an image,
    perturbing at least one bit in each pixel of a plurality of pixels selected from the received image to encode information therein, wherein at least one other bit in each of the plurality of selected pixels is not perturbed, and wherein bits in one or more bit positions that are higher than one or more least significant bit positions are perturbed in a blue but not a green channel where the received image is a RGB image or a UV but not a Y channel where the received image is a YUV image, and
    subsequent to the perturbing, transmitting the image having the information encoded therein to the other computing device.

* * * * *